United States Patent
Omori et al.

(10) Patent No.: US 10,150,885 B2
(45) Date of Patent: Dec. 11, 2018

(54) GAS-BARRIER PACKAGING MATERIAL

(71) Applicant: Toppan Printing Co., Ltd., Taito-ku, Tokyo (JP)

(72) Inventors: Noboru Omori, Taito-ku (JP); Katsumi Kawaguchi, Taito-ku (JP)

(73) Assignee: Toppan Printing Co., Ltd., Toyko (JP)

( * ) Notice: Subject to any disclaimer, the term of this patent is extended or adjusted under 35 U.S.C. 154(b) by 191 days.

(21) Appl. No.: 14/953,128

(22) Filed: Nov. 27, 2015

(65) Prior Publication Data
US 2016/0075910 A1 Mar. 17, 2016

Related U.S. Application Data

(63) Continuation of application No. PCT/JP2014/062058, filed on May 1, 2014.

(30) Foreign Application Priority Data

May 28, 2013 (JP) ................................. 2013-112135

(51) Int. Cl.
| | |
|---|---|
| *B32B 7/02* | (2006.01) |
| *B32B 7/04* | (2006.01) |
| *B32B 7/10* | (2006.01) |
| *B32B 7/12* | (2006.01) |
| *B32B 27/08* | (2006.01) |
| *B32B 27/18* | (2006.01) |
| *B32B 27/26* | (2006.01) |

(Continued)

(52) U.S. Cl.
CPC ............ *C09D 167/00* (2013.01); *C08J 7/047* (2013.01); *B05D 3/02* (2013.01); *B05D 3/10* (2013.01); *B05D 3/107* (2013.01); *B32B 7/02* (2013.01); *B32B 7/04* (2013.01); *B32B 7/10* (2013.01); *B32B 7/12* (2013.01); *B32B 15/08* (2013.01); *B32B 15/09* (2013.01); *B32B 27/08* (2013.01); *B32B 27/18* (2013.01); *B32B 27/26* (2013.01); *B32B 27/306* (2013.01); *B32B 27/36* (2013.01); *B32B 27/40* (2013.01); *B32B 2250/05* (2013.01); *B32B 2255/10* (2013.01); *B32B 2255/26* (2013.01); *B32B 2255/28* (2013.01); *B32B 2307/7242* (2013.01); *B32B 2307/7244* (2013.01); *B32B 2307/7246* (2013.01); *B32B 2311/00* (2013.01); *B32B 2367/00* (2013.01); *B32B 2375/00* (2013.01); *B32B 2439/00* (2013.01); *B32B 2439/70* (2013.01); *B32B 2439/80* (2013.01); *C08J 7/08* (2013.01); *C08J 2367/00* (2013.01); *C08J 2367/02* (2013.01); *C08J 2375/06* (2013.01); *C08J 2433/00* (2013.01); *C08J 2475/04* (2013.01); *C08K 3/18* (2013.01); *C08K 3/20* (2013.01); *C08K 3/22* (2013.01); *C08K 5/0025* (2013.01); *C08K 5/29* (2013.01); *C08K 5/54* (2013.01); *C08K 5/541* (2013.01); *C08K 5/544* (2013.01); *C08K 5/548* (2013.01); *C08K 5/5465* (2013.01); *C09D 133/02* (2013.01); *C09D 175/04* (2013.01); *C09D 175/06* (2013.01); *C09D 175/14* (2013.01); *C09J 133/00* (2013.01); *C09J 133/02* (2013.01); *C09J 133/066* (2013.01); *C09J 175/04* (2013.01); *Y10T 428/1379* (2015.01); *Y10T 428/31551* (2015.04); *Y10T 428/31605* (2015.04); *Y10T 428/31786* (2015.04)

(58) Field of Classification Search
None
See application file for complete search history.

(56) References Cited

U.S. PATENT DOCUMENTS 4,175,066 A * 11/1979 Shibazaki ........... B01F 17/0028
210/701
4,826,907 A * 5/1989 Murao ................. C09D 133/06
524/394

(Continued)

FOREIGN PATENT DOCUMENTS

| JP | 2000-119361 A | * | 4/2000 |
|---|---|---|---|
| JP | 2000-119362 A | * | 4/2000 |

(Continued)

OTHER PUBLICATIONS

International Search Report issued in PCT/JP2014/062058 dated Aug. 12, 2014.

(Continued)

*Primary Examiner* — Vivian Chen
(74) *Attorney, Agent, or Firm* — Foley & Lardner LLP

(57) ABSTRACT

A gas-barrier packaging material including: a support; an adhesive layer laminated on the support; a first barrier layer laminated on the adhesive layer; a second barrier layer laminated on the first barrier layer; and a protective layer formed of a coating liquid that contains a polyvalent metal compound, a polyester based resin, and a dispersant that is a sodium salt of a polycarboxylic acid based resin, the protective layer being laminated on the second barrier layer. In the gas-barrier packaging material, the protective layer contains the polyvalent metal compound by about 40 to 90 wt % relative to 100 wt % of the protective layer. When the second barrier layer is separated and an infrared absorption spectrum of the second barrier layer after separation is measured by a transmission method, a ratio between a maximum peak height α in a range of about 1,490 to about 1,659 cm$^{-1}$ and a maximum peak height β in a range of about 1,660 to about 1,750 cm$^{-1}$ as expressed by α/β is less than about one.

2 Claims, No Drawings

(51) Int. Cl.

| | |
|---|---|
| B32B 27/36 | (2006.01) |
| B32B 27/30 | (2006.01) |
| B32B 27/40 | (2006.01) |
| C09D 167/00 | (2006.01) |
| C09D 133/02 | (2006.01) |
| C09D 175/04 | (2006.01) |
| C09D 175/06 | (2006.01) |
| C09D 175/14 | (2006.01) |
| B05D 3/10 | (2006.01) |
| B05D 3/02 | (2006.01) |
| C09J 133/00 | (2006.01) |
| C09J 133/02 | (2006.01) |
| C09J 175/04 | (2006.01) |
| C08K 3/18 | (2006.01) |
| C08K 3/20 | (2006.01) |
| C08K 3/22 | (2006.01) |
| C08K 5/29 | (2006.01) |
| C08K 5/54 | (2006.01) |
| C08K 5/541 | (2006.01) |
| C08K 5/544 | (2006.01) |
| C08K 5/5465 | (2006.01) |
| C08K 5/548 | (2006.01) |
| B32B 15/08 | (2006.01) |
| B32B 15/09 | (2006.01) |
| C08J 7/04 | (2006.01) |
| B29C 71/02 | (2006.01) |
| C09J 133/06 | (2006.01) |
| C08K 5/00 | (2006.01) |

(56) References Cited

U.S. PATENT DOCUMENTS

| | | | |
|---|---|---|---|
| 6,376,570 B1* | 4/2002 | Zhao | C09D 133/064 522/42 |
| 8,703,298 B2* | 4/2014 | Nakamura | C08F 220/06 427/372.2 |
| 2005/0131162 A1* | 6/2005 | Tanaka | B32B 27/06 525/329.7 |
| 2005/0214530 A1* | 9/2005 | Tanaka | B32B 27/06 428/347 |
| 2006/0228310 A1* | 10/2006 | Lyth | A61K 8/044 424/59 |
| 2007/0111005 A1* | 5/2007 | Oshita | B32B 27/08 428/411.1 |
| 2007/0269650 A1* | 11/2007 | Leuninger | C09D 5/028 428/327 |
| 2008/0262179 A1* | 10/2008 | Nakamura | C08F 220/06 526/241 |
| 2009/0022981 A1* | 1/2009 | Yoshida | C08J 7/045 428/336 |
| 2009/0068484 A1* | 3/2009 | Toshima | C08G 18/62 428/480 |
| 2009/0134476 A1* | 5/2009 | Richards, Jr. | H01L 29/7838 257/403 |
| 2009/0269592 A1* | 10/2009 | Hakamata | B32B 27/08 428/446 |
| 2009/0317626 A1* | 12/2009 | Tiarks | C08F 2/24 428/331 |
| 2009/0324836 A1* | 12/2009 | Tsurugi | B01J 41/04 427/385.5 |
| 2010/0068438 A1* | 3/2010 | Yamazaki | C09D 5/024 428/36.92 |
| 2010/0136350 A1* | 6/2010 | Inaba | B32B 7/12 428/447 |
| 2011/0217561 A1* | 9/2011 | Fujimura | C08K 3/22 428/480 |
| 2012/0128956 A1* | 5/2012 | Takatsu | C08J 7/045 428/216 |
| 2014/0248449 A1* | 9/2014 | Sasaki | C09D 7/1233 428/34.3 |
| 2014/0248450 A1* | 9/2014 | Sasaki | C01B 25/36 428/34.3 |
| 2014/0248500 A1* | 9/2014 | Yoshida | C09D 7/12 428/448 |
| 2016/0229605 A1* | 8/2016 | Omori | B32B 27/00 |
| 2017/0057209 A1* | 3/2017 | Omori | B32B 27/00 |

FOREIGN PATENT DOCUMENTS

| | | | |
|---|---|---|---|
| JP | 2000-238172 A | * | 9/2000 |
| JP | 2008-068574 A | * | 3/2008 |
| JP | 2008-68574 A | | 3/2008 |
| JP | 4205806 B2 | | 10/2008 |
| JP | 4200972 B2 | | 12/2008 |
| JP | 2009-006707 A | | 1/2009 |
| JP | 2009-6707 A | | 1/2009 |
| JP | 2009-062060 A | * | 3/2009 |
| JP | 2009-62060 A | | 3/2009 |
| JP | 4373797 B2 | | 9/2009 |
| JP | 2012-82372 A | | 4/2012 |
| JP | 2012-082372 A | * | 4/2012 |
| JP | 2012-139942 A | * | 7/2012 |
| JP | 5012895 B2 | | 8/2012 |
| JP | 2013-018188 A | * | 1/2013 |
| JP | 2013-018188 A | | 1/2013 |
| WO | WO-2012/093597 A1 | | 7/2012 |
| WO | WO 2013/051286 A | * | 4/2013 |
| WO | WO 2013/051287 A | * | 4/2013 |
| WO | WO 2013/051288 A | * | 4/2013 |

OTHER PUBLICATIONS

First Office Action issued in Chinese Patent Application No. 201480030447.1 dated Nov. 7, 2016.
Taiwanese Office Action dated Nov. 8, 2017 in corresponding application No. 103118345.

* cited by examiner

GAS-BARRIER PACKAGING MATERIAL

CROSS-REFERENCE TO RELATED PATENT APPLICATIONS

This application is a continuation application filed under 35 U.S.C. 111(a) claiming the benefit under 35 U.S.C. §§ 120 and 365(c) of PCT International Application No. PCT/JP2014/062058 filed on May 1, 2014, which is based upon and claims the benefit of priority of Japanese Application No. 2013-112135, filed on May 28, 2013, the entire contents of them all are hereby incorporated by reference.

TECHNICAL FIELD

The present invention relates to a gas-barrier packaging material.

BACKGROUND

Packaging materials used for the packages of foods, medical and pharmaceutical products, and the like are desired to prevent the degradation of contents. For example, packaging materials for foods are desired to minimize the oxidation and degradation of proteins, fats and oils, and the like and to keep flavor and freshness. Moreover, packaging materials for medical and pharmaceutical products required to be handled in aseptic conditions are desired to minimize the degradation of the active ingredients of contents and to keep the effects. Such degradation of contents is mainly caused by oxygen and water vapor passed through packaging materials or other gasses reacting with the contents. Therefore, packaging materials used for packaging foods, medical and pharmaceutical products, and the like are desired to have properties (gas-barrier properties) that prevent passage of gases such as oxygen and water vapor.

To attempt to meet these demands, a gas barrier film formed of a polymer (gas-barrier polymer) that has relatively high gas-barrier properties, and a laminate using this film as a substrate film are conventionally used.

Conventionally, such a polymer is used for a gas-barrier polymer in which a high hydrogen bonding group having high hydrophilic properties is contained in a molecule, as typified by poly(meta)acrylic acid and polyvinyl alcohol. However, although packaging materials formed of these polymers have highly excellent gas-barrier properties against oxygen and the like under dry conditions, the packaging materials have a problem in that under highly humid conditions, the gas-barrier properties against oxygen and the like are greatly degraded because of the hydrophilic properties of the packaging materials, or have a problem in that the above film has poor resistances against humidity and hot water.

To solve these problems, it is known that a polycarboxylic acid based polymer layer and a polyvalent metal compound containing layer are adjacently deposited on a substrate and a polyvalent metal salt of a polycarboxylic acid based polymer is formed by an intercalation reaction (as described in PTLs 1 and 2, for example). According to the disclosures, gas-barrier packaging materials thus obtained have high gas-barrier properties against oxygen under high humidity.

Moreover, there is known a gas-barrier packaging material that does not rely on humidity and does not need retort processing and the like (as described in PTLs 3 to 5, for example)

CITATION LIST

Patent Literature

PTL 1: JP-B-4373797
PTL 2: JP-B-5012895
PTL 3: JP-B-4200972
PTL 4: JP-B-4205806
PTL 5: JP-A-2013-018188

SUMMARY OF THE INVENTION

Technical Problem

However, the gas-barrier packaging materials described in PTLs 1 and 2 have problems in that an intercalation reaction by retort processing or the like is required to be caused and water vapor barrier properties are poor.

Moreover, the gas-barrier packaging materials described in PTLs 3 to 5 include a deposited film formed of an inorganic compound and have oxygen barrier properties and water vapor barrier properties. However, these gas-barrier packaging materials have a problem in that the barrier properties are easily degraded when the deposited film is subjected to abuse such as bending and extension (rough use of the packaging materials) or to high temperature and high pressure processing such as retort processing because of the tendency that the deposited film is easily cracked.

Moreover, liquid precursors for coating liquids (usually stored without addition of a hardener, but used as a coating liquid by addition of a hardener immediately before the use) for use in the manufacture of the gas-barrier packaging materials described in PTLs 1 and 2 easily form aggregates because of poor stability, and therefore there is still plenty of room for improvement from the viewpoint of keeping qualities.

The present invention has been made in view of the above circumstances, and has a possible object of providing a gas-barrier packaging material having improved or even excellent oxygen barrier properties and water vapor barrier properties without being subjected to retort processing or the like. Moreover, another possible object is to provide a gas-barrier packaging material with improved and even excellent abuse-resistant properties (degradation resistance properties) and resistant to high temperature and high pressure processing such as retort processing, and improved or even remarkably excellent gas-barrier properties against oxygen after the high temperature and high pressure processing such as retort processing, and further improved or even excellent in productivity with the use of a coating liquid formed of a liquid precursor having good storage life.

Solution to Problem

A gas-barrier packaging material according to a first aspect of the present invention is a gas-barrier packaging material including: a support; an adhesive layer laminated on the support; a first barrier layer laminated on the adhesive layer; a second barrier layer laminated on the first barrier layer; and a protective layer formed of a coating liquid that contains a polyvalent metal compound, a polyester based resin, and a dispersant that is a sodium salt of a polycarboxylic acid based resin, the protective layer being laminated on the second barrier layer. In the gas-barrier packaging material, the protective layer contains the polyvalent metal compound by about 40 to 90 wt % relative to 100 wt % of the protective layer. When the second barrier layer is separated and an infrared absorption spectrum of the second barrier layer after separation is measured by a transmission method, a ratio between a maximum peak height α in a range of about 1,490 to 1,659 cm$^{-1}$ and a maximum peak height β in a range of about 1,660 to 1,750 cm$^{-1}$ as expressed by α/β is less than about one.

In the first aspect of the present invention, the coating liquid that forms the protective layer may contain the dispersant by 2 to 20 wt % relative to 100 wt % of the polyvalent metal compound.

A gas-barrier packaging material according to a second aspect of the present invention is a gas-barrier packaging material obtained by applying at least one processing step selected from a group consisting of retort processing, boiling, and humidification to the gas-barrier packaging material. In the gas-barrier packaging material, when the second barrier layer is separated and an infrared absorption spectrum of the second barrier layer after separation is measured by a transmission method, a ratio between a maximum peak height α in a range of about 1,490 to 1,659 cm$^{-1}$ and a maximum peak height β in a range of about 1,660 to 1,750 cm$^{-1}$ as expressed by α/β is not less than about one.

Advantageous Effects of Invention

According to the first aspect of the present invention, a gas-barrier packaging material having improved or even excellent oxygen barrier properties and water vapor barrier properties can be provided without conducting retort processing or the like. Moreover, it is possible to provide a gas-barrier packaging material with improved or even excellent abuse-resistant properties (degradation resistance properties), resistant to high temperature and high pressure processing such as retort processing, and improved or even remarkably excellent in gas-barrier properties against oxygen after high temperature and high pressure processing such as retort processing. Furthermore, using a coating liquid that is improved or even excellent in storage life, a gas-barrier packaging material that is improved or even excellent in productivity can be provided.

According to the first aspect of the present invention, a gas-barrier packaging material is provided which is used for packaging foods, drinks, chemicals, medical and pharmaceutical products, precision metal components such as electronic components, and the like, which are easily degraded by the influence of oxygen and the like. Moreover, it is possible to provide a gas-barrier packaging material that can be favorably used as packaging materials for packaging products that need stable gas barrier performance for a longer time and need processing under high temperature and hot water conditions such as boiling and retort sterilization.

Furthermore, use of a coating liquid according to the first aspect of the present invention can provide a gas-barrier packaging material with less or no need of a low temperature storage facility such as a refrigerator and a facility promptly used after preparation of a coating liquid, in preserving a liquid precursor.

DESCRIPTION OF REPRESENTATIVE EMBODIMENTS

In the following, preferred embodiments of a gas-barrier packaging material according to the present invention will be described. However, these embodiments will be described only as examples for better understanding of the teachings of the present invention, and should not be construed as limiting the present invention unless otherwise specified.

First Embodiment

A gas-barrier packaging material according to a first embodiment of the present invention includes: a support; an adhesive layer laminated on the support; a first barrier layer laminated on the adhesive layer; a second barrier layer laminated on the first barrier layer; and a protective layer formed of a coating liquid containing a polyvalent metal compound, a polyester based resin, and a dispersant that is a sodium salt of a polycarboxylic acid based resin, the protective layer being laminated on the second barrier layer. The gas-barrier packaging material contains the polyvalent metal compound by about 40 to about 90 wt % relative to 100 wt % of the protective layer, and has a ratio of α/β of less than one between a maximum peak height α in a range of about 1,490 to about 1,659 cm-1 and a maximum peak height β in a range of about 1,660 to about 1,750 cm-1 when the second barrier layer is separated and an infrared absorption spectrum of the second barrier layer after separation is measured by a transmission method.

[Support]

The shape of the support is not specifically limited and includes the shape of a film, sheet, bottle, cup, tray, tank, or tube, for example. In the present embodiment, from the viewpoint of depositing the barrier layers and the like, the shape is preferably of a film or a sheet.

Although the thickness of the support depends on usages of the support, the thickness can be 5 μm to 5 cm, for example. For use as a film or a sheet, the thickness of the support is preferably 5 to 800 μm, and more preferably 10 to 500 μm.

When the thickness of the support is within the above ranges, workability and productivity in each use are improved or even excellent.

For example, the materials of such a support include plastics, paper sheets, and rubbers. Among these materials, plastics are preferable from the viewpoint of the support, the barrier layers, and the like.

For example, the materials of plastics include: polyolefin based polymers, such as low-density polyethylene, high-density polyethylene, linear low-density polyethylene, polypropylene, poly 4-methylpentene, and cyclic polyolefins, and copolymers of these polymers, and acid-modified products of these polymers; vinyl acetate based copolymers, such as polyvinyl acetate, ethylene-vinyl acetate copolymers, saponified products of ethylene-vinyl acetate copolymers, and polyvinyl alcohol; polyester based polymers, such as polyethylene terephthalate, polybutylene terephthalate, polyethylene naphtahalate, poly-ε-caprolactone, polyhydroxybutyrate, and polyhydroxyvalerate, and copolymers of these polymers; polyamide based polymers, such as nylon 6, nylon 66, nylon 12, nylon 6,66 copolymers, nylon 6/12 copolymers, and metaxylylene adipamide/nylon 6 copolymers, and copolymers of these polymers; polyether based polymers, such as polyethylene glycol, polyethersulfone, polyphenylene sulfide, and polyphenylene oxide; chlorine- and/or fluorine-containing polymers, such as polyvinyl chloride, polyvinylidene chloride, polyvinyl fluoride, and polyvinylidene fluoride, and copolymers of these polymers; acrylic based polymers, such as polymethyl acrylate, polyethyl acrylate, polymethyl methacrylate, polyethyl methacrylate, and polyacrylonitrile, and copolymers of these polymers; polyimide based polymers and copolymers of the polymers; resins, such as alkyd resins, melamine resins, acrylic resins, cellulose nitrate, urethane resins, unsaturated polyester resins, phenol resins, amino resins, fluorine resins, and epoxy resins used for coating; and natural polymers, such as cellulose, starch, pullulan, chitin, chitosan, glucomannan, agarose, and gelatin, and mixtures of these polymers.

Such a support may be a substrate whose surface has been subjected to surface activation treatment, such as for example corona treatment, flame treatment, and plasma treatment, from the viewpoint of the adhesion between the substrate and the adhesive layer.

[Adhesive Layer]

The adhesive layer is formed of a coating liquid containing a composite of silicon compound (1) having any one of an isocyanate group, an amino group, and a mercapto group or a hydrolysate of the silicon compound (1), acrylic polyol having a hydroxyl number of 5 to 200 (KOH mg/g), and an isocyanate compound. The adhesive layer is preferably formed by coating and drying the coating liquid.

The thickness of the first adhesive layer is not specifically limited as long as a coating film can be uniformly formed. However, generally, the thickness is preferably in a range of 0.01 to 2 μm, and more preferably in a range of 0.05 to 0.5 μm.

In the case where the thickness is not less than 0.01 μm, a coating film in a uniform thickness is easily obtained, and is improved or even excellent from the viewpoint of adhesion. In the case where the thickness is not more than 2 μm, a coating film can be imparted with flexibility, and there is no concern that the coating film is cracked because of an external cause.

<Silicon Compound (1)>

Examples of the silicon compound (1) that can be used include one, or two or more silane coupling agents, such as vinyltrimethoxysilane, γ-chloropropylmethyldimethoxysilane, γ-chloropropyltrimethoxysilane, glycidyloxypropyltrimethoxysilane, γ-methacryloxypropyltrimethoxysilane, and γ-methacryloxypropylmethyldimethoxysilane, and hydrolysates of these agents.

Among these silane coupling agents, a compound having a functional group reacting with the hydroxyl group of polyol or the isocyanate group of an isocyanate compound is specifically preferable. As an example of such a compound, mention can be made of a compound containing an isocyanate group, such as γ-isocyanatepropyltriethoxysilane or γ-isocyanatepropyltrimethoxysilane, a compound containing a mercapto group, such as γ-mercaptpropyltriethoxysilane, and a compound containing an amino group, such as γ-aminopropyltriethoxysilane, γ-aminopropyltrimethoxysilane, N-β-(aminoethyl)-γ-aminopropyltriethoxysilane, or γ-phenylaminopropyltrimethoxysilane.

Such a compound may contain an epoxy group, such as γ-glycidyloxypropyltrimethoxysilane or β-(3,4-epoxycyclohexyl)ethyltrimethoxysilane, or a compound obtained by adding alcohol and the like and a hydroxyl group and the like to a silane coupling agent, such as vinyltrimethoxysilane and vinyl-tris(β-methoxyethoxy)silane. One, or two or more of these compounds can be used.

In such silane coupling agents, an organic functional group existing at one end of a silane coupling agent interacts with a composite formed of polyol and an isocyanate compound in a composite formed of polyol and an isocyanate compound. Moreover, with the use of a silane coupling agent that contains a functional group reacting with a hydroxyl group of polyol or an isocyanate group of an isocyanate compound, a covalent bond is formed between the hydroxyl group of polyol or the isocyanate group of the isocyanate compound and the functional group of the silane coupling agent to form a stronger primer layer. Furthermore, an alkoxy group at the other end of the silane coupling agent or a silanol group generated by hydrolyzing the alkoxy group exhibits a strong interaction with a metal in an inorganic oxide and a hydroxyl group or the like of high polarity on the surface of the inorganic oxide, so that high adhesion between the silane coupling agent and the inorganic oxide appears, and targeted physical properties can be obtained. Therefore, the primer layer may be of a compound obtained by subjecting a silane coupling agent to hydrolysis reactions together with metal alkoxide. The alkoxy group of the silane coupling agent may be a chloro group, acetoxy group, or the like. When these silane coupling agents are compounds that form a silanol group by hydrolyzing the alkoxy group, chloro group, acetoxy group, and the like of the agents, these compounds can be used for the composite.

<Polyol>

Polyol is a compound having two or more of hydroxyl groups at the terminal of the polymer, and is a compound that reacts with the isocyanate group of an isocyanate compound to be added later. This polyol preferably is a polyol obtained by polymerizing an acrylic acid derivative monomer, or an acrylic polyol that is obtained by copolymerizing an acrylic acid derivative monomer with another monomer.

Among polyols, the following acrylic polyol is preferably used: acrylic polyol that is obtained by polymerized an acrylic acid derivative monomer, such as ethyl methacrylate, hydroxyethyl methacrylate, hydroxypropyl methacrylate, and hydroxybutyl methacrylate; and acrylic polyol that is obtained by copolymerizing the acrylic acid derivative and another monomer, such as styrene.

Moreover, in consideration of the reactivity of polyol with an isocyanate compound and the compatibility of polyol with a silane coupling agent, the hydroxyl number of the acrylic polyol preferably ranges from 5 to 200 (KOH mg/g). The formulation ratio of acrylic polyol to a silane coupling agent (acrylic polyol/silane coupling agent) is preferably in a range of 1/1 to 1000/1 weight ratio, and more preferably in a range of 2/1 to 100/1. Solvents for dissolution and dilution are not specifically limited as long as the solvents are dissolvable and dilutable. For example, such solvents that can be used include: esters such as ethyl acetate and butyl acetate; alcohols such as methanol, ethanol, and isopropyl alcohol; ketones such as methyl ethyl ketone; and aromatic hydrocarbons such as toluene and xylene, which are used singly or in combination with any formulation. However, when an aqueous solution such as hydrochloric acid is used for hydrolyzing a silane coupling agent, it is preferable to use a solvent that is any mixture of alcohols such as isopropyl alcohol as a cosolvent with ethyl acetate as a polar solvent.

<Isocyanate Compound>

An isocyanate compound is added to enhance the adhesion between a plastic substrate and inorganic oxide by urethane bond which is formed by a reaction between an isocyanate group and polyol such as acrylic polyol, and the compound mainly functions as a cross-linker or a hardener. Specific examples of isocyanate compounds exerting the function includes monomers such as tolylene diisocyanate (TDI) and diphenylmethane diisocyanate (MDI) of aromatic series, and xylylene diisocyanate (XDI), hexamethylene diisocyanate (HMDI), and isophorone diisocyanate (IPDI) of aliphatic series, as well as polymers of these materials, or one of derivatives, or two or more of these materials.

The formulation ratio between acrylic polyol and an isocyanate compound is not limited specifically. However, a very small amount of an isocyanate compound sometimes causes undercure, whereas a very large amount of an isocyanate compound causes blocking and the like, leading to a processing problem. Therefore, a preferable formulation ratio between acrylic polyol and an isocyanate compound is one in which an NCO group (isocyanate group) derived from an isocyanate compound is not more than 50 times an OH group (hydroxyl group) derived from acrylic polyol, and specifically preferable is one in which the NCO group (isocyanate group) and the OH group (hydroxyl group) are contained by equivalent weight. The mixing method may be a known method, and not specifically limited.

<Coating Liquid A for the Adhesive Layer>

The adhesive layer is formed of a coating liquid A. The coating liquid A contains a composite of silicon compound (1) having any one of an isocyanate group, an amino group, and a mercapto group or a hydrolysate of the silicon compound (1), an acrylic polyol having a hydroxyl number of 5 to 200 (KOH mg/g), and an isocyanate compound. A solvent used for the coating liquid A includes, but is not specifically limited, water and organic solvents, such as methyl alcohol, ethyl alcohol, isopropyl alcohol, n-propyl alcohol, n-butyl alcohol, n-pentyl alcohol, dimethyl sulphoxide, dimethyl formamide, dimethyl acetamide, toluene, hexane, heptane, cyclohexane, acetone, methyl ethyl ketone, diethyl ether, dioxane, tetrahydrofuran, ethyl acetate, and butyl acetate. Moreover, the solid content concentration of such a coating liquid is preferably in a range of 0.5 to 50 percent by mass from the viewpoint of coating suitability.

[First Barrier Layer]

The first barrier layer is an inorganic oxide thin film layer formed of inorganic oxide in a thickness of 5 to 300 nm. The inorganic oxide is aluminum oxide, silicon oxide, or a mixture of aluminum oxide and silicon oxide. There are various methods of forming the first barrier layer. The first barrier layer can be formed by generally used vacuum deposition, and other methods of forming thin films, such as sputtering, ion plating, and chemical vapor deposition can also be used.

As a preferable heating method equipped in a vacuum deposition apparatus used for vacuum deposition, mention can be made of an electron beam heating method, a resistance heating method, or an induction heating method. In order to improve the adhesion and the denseness of a deposited thin film, plasma assisted deposition and ion beam assisted deposition can also be used. Moreover, in order to enhance the transparency of a deposited thin film, reactive deposition may be performed, with which an oxygen gas or the like is blown in. Aluminum oxide preferably has an abundance ratio of aluminum (Al) to oxygen (O), Al:O=1:1.5 to 1:2.0.

For example, an aluminum oxide deposited layer can be formed by at least one of reactive deposition, reactive sputtering, and reactive ion plating methods, using aluminum as an evaporation material. In the method, a thin film is formed in the presence of a mixed gas of aluminum with oxygen, a carbon dioxide gas, an inert gas, and the like. In the formation, since aluminum reacts with oxygen to form $Al_2O_3$ in stoichiometry, a ratio is considered to be Al:O=1:1.5. However, there are some chemical species that are partially present in the form of aluminum or that are present in the form of aluminum peroxide depending on deposition methods. When the abundance ratio of elements in a deposited layer is measured using an x-ray photoelectron spectroscopic analyzer (ESCA) and the like, the ratio is not always Al:O=1:1.5. Generally, good gas-barrier properties can be provided by a deposited layer whose ratio of oxygen is smaller and ratio of aluminum is greater than Al:O=1:1.5 because the deposited layer forms a dense film. However, the deposited film (the deposited layer) is colored dark, and the light transmittance is prone to be low. On the contrary, a deposited layer whose ratio of oxygen is greater and ratio of aluminum is lower than Al:O=1:1.5 forms a coarse film, and the deposited layer will be a transparent deposited layer having a high light transmittance although the gas-barrier properties are poorer.

[Second Barrier Layer]

The second barrier layer preferably contains a polycarboxylic acid based polymer. The polycarboxylic acid based polymer has two or more of carboxyl groups in a molecule. Such a polycarboxylic acid based polymer includes, for example: an ethylenically unsaturated carboxylic acid polymer (copolymer); a copolymer of ethylenically unsaturated carboxylic acid and another ethylenically unsaturated monomer; and alginic acid, carboxymethyl cellulose, and acidic polysaccharides having a carboxyl group in a molecule such as of pectin. These polycarboxylic acid based polymers may be used singly or in combination of two or more as a mixture.

The thickness of the second barrier layer is not specifically limited as long as a uniform coating film can be formed. Generally, the thickness is preferably in a range of 0.01 to 2.0 μm, and more preferably in a range of 0.05 to 1.0 μm.

Such an ethylenically unsaturated carboxylic acid includes, for example, acrylic acid, methacrylic acid, itaconic acid, maleic acid, fumaric acid, and crotonic acid. Further, an ethylenically unsaturated monomer copolymerizable with these ethylenically unsaturated carboxylic acids includes, for example, ethylene, propylene, and saturated carboxylic acid vinyl esters such as vinyl acetate, as well as alkyl acrylates, alkyl methacrylates, alkyl itaconates, vinyl chloride, vinylidene chloride, styrene, acrylamide, and acrylonitrile.

Among these polycarboxylic acid based polymers, from the viewpoint of the gas-barrier properties of a gas-barrier laminate to be obtained, a polycarboxylic acid based polymer is preferably polymers each containing a constitutional unit derived from at least one polymerizable monomer selected from acrylic acid, maleic acid, methacrylic acid, itaconic acid, fumaric acid, and crotonic acid, or a mixture of the polymers. The polycarboxylic acid based polymer is specifically preferably polymers each containing a constitutional unit derived from at least one polymerizable monomer selected from acrylic acid, maleic acid, methacrylic acid, and itaconic acid, or a mixture of the polymers.

A homopolymer or a copolymer may be used for the polymer. In the polymer, a constitutional unit derived from at least one polymerizable monomer selected from the acrylic acid, the maleic acid, the methacrylic acid, and the itaconic acid is preferably 80 mol % or more, and more preferably 90 mol % or more (where the total constitutional unit is 100 mol %).

In the case where constitutional units other than the above constitutional unit are contained, the other constitutional units can include ethylenically unsaturated monomers copolymerizable with the ethylenically unsaturated carboxylic acids, for example.

The polycarboxylic acid based polymer used in the present embodiment preferably has a number average molecular weight in a range of 2,000 to 10,000,000. In the case where the number average molecular weight is 2,000 or greater, a gas-barrier packaging material to be obtained has improved or even excellent water resisting properties, has no degradation of gas-barrier properties and transparency caused by moisture, and does not suffer from whitening. In the case where the number average molecular weight is 10,000,000 or less, the viscosity is improved in forming the adhesive layer by coating, and the coating properties are less degraded. Furthermore, from the viewpoint of the water resisting properties of a gas-barrier laminate to be obtained, the number average molecular weight of such a polycarboxylic acid based polymer is preferably in a range of 5,000 to 1,000,000. It should be noted that the number average molecular weight is obtained by gel permeation chromatography (GPC) in terms of polystyrene.

The polycarboxylic acid based polymers may be used singly used or in combination of two or more as a mixture in the present embodiment.

The polycarboxylic acid based polymer used in the present embodiment, a part of a carboxyl group contained in the polycarboxylic acid based polymer may be neutralized in advance with a basic compound. The basic compound is preferably at least one selected from a group consisting of a polyvalent metal compound, a univalent metal compound, and ammonia.

A part of a carboxyl group contained in a polycarboxylic acid based polymer is neutralized in advance, so that the water resisting properties of the second barrier layer can be improved. Thus, the expansion of the second barrier layer can be prevented in depositing the protective layer, described later, formed of a water-based coating liquid. From the viewpoint of the stability of the precursor coating liquid of the second barrier layer, the degree of neutralization of the carboxyl group is preferably 30 mol % or less, and more preferably 25 mol % or less.

The second barrier layer contains at least one silicon compound (4) selected from a group consisting of a silane coupling agent expressed by general formula (1) below, a hydrolysate of the silane coupling agent, and a condensate of the silane coupling agent and the hydrolysate.

[Chem. 1]

Si(OR)3Z (1)

In formula (1), R may be an alkyl group having a carbon number of 1 to 6, Z may be an organic group containing a glycidyloxy group or an amino group, and R may remain unchanged or may be changed.

In the present embodiment, the phrase "at least one silicon compound (4) selected from a group consisting of a silane coupling agent expressed by the general formula (1), a hydrolysate of the silane coupling agent, and a condensate of the silane coupling agent and the hydrolysate" is also simply referred to as "silicon compound (4)". Moreover, a compound that is a condensed hydrolysate of the silane coupling agent expressed by the general formula (1) is also expressed as a hydrolyzed condensate.

The silicon compound (4) may be a silane coupling agent expressed by the general formula (1), may be a hydrolysate obtained by hydrolyzing the compound, or may be a condensate of the silane coupling agent and the hydrolysate.

The silicon compound (4), such may be a compound obtained by subjecting a silane coupling agent expressed by the general formula (1) to hydrolysis and a condensation reaction using a sol-gel method, for example.

Generally, a silane coupling agent expressed by the general formula (1) easily causes hydrolysis, and easily causes condensation reactions in the presence of acid or alkaline, and thus. Therefore, it is a rare case where a silane coupling agent expressed by the general formula (1) is present alone, a hydrolysate of the silane coupling agent is present alone, or a condensate of the silane coupling agent and the hydrolysate is present alone. In other words, the silicon compound (4) generally contains a silane coupling agent expressed by the general formula (1), a hydrolysate of the silane coupling agent, and a condensate of the silane coupling agent and the hydrolysate in a mixed form. The hydrolysate includes a partial hydrolysate and a complete hydrolysate.

The silicon compound (4) preferably contains at least a hydrolyzed condensate. In a method used in manufacturing a hydrolyzed condensate, a silane coupling agent expressed by the general formula (1) may be directly mixed with a liquid containing the polycarboxylic acid based polymer and water, or water may be added to a silane coupling agent for hydrolysis and a condensation reaction subsequent to the hydrolysis to obtain a hydrolyzed condensate before the agent is mixed with the polycarboxylic acid based polymer.

As specific examples of a silane coupling agent expressed by the general formula (1), mention can be made of γ-glycidoxypropyltrimethoxysilane, γ-glycidoxypropyltriethoxysilane, γ-aminopropyltrimethoxysilane, and γ-aminopropyltriethoxysilane. Among them, γ-glycidoxypropyltrimethoxysilane and γ-aminopropyltrimethoxysilane are preferable. These silane coupling agents may be used singly or in combination of two or more.

The second barrier layer according to the present embodiment contains the silicon compound (4). In the second barrier layer according to the present embodiment, use of only a small amount of the silicon compound (4) achieves an improved or even excellent effect, and thus it is preferable that the second barrier layer contains a small amount of the silicon compound (4) from the viewpoint of costs.

In the case where the silicon compound (4) contains a hydrolyzed condensate, at least a part of an alkoxy group (OR) contained in a silane coupling agent expressed by the general formula (1) is substituted for a hydroxyl group to be a hydrolysate. The hydrolysate is condensed to form a compound in which a silicon atom (Si) is bonded through oxygen. This condensation is repeated to obtain a hydrolyzed condensate.

In the amount of the silicon compound (4) contained in the second barrier layer, the weight ratio between the polycarboxylic acid based polymer and the weight of the silicon compound (4) (polycarboxylic acid based polymer:silicon compound (4)) is preferably in a range of 99.5:0.5 to 80.0:20.0. However, the weight of the silicon compound (4) other than a silane coupling agent expressed by the general formula (1) corresponds to the weight in terms of a silane coupling agent expressed by the general formula (1). In other words, the silicon compound (4) includes a silane coupling agent expressed by the general formula (1), a hydrolysate of the silane coupling agent, and a condensate of the silane coupling agent and the hydrolysate in a mixed form. In the present embodiment, the weight of the silicon compound (4) is the value in terms of a silane coupling agent expressed by the general formula (1), that is, the feed amount of a silane coupling agent expressed by the general formula (1).

In the case where at least one of γ-glycidoxypropyltrimethoxysilane and γ-glycidoxypropyltriethoxysilane is used for a silane coupling agent expressed by the general formula (1), the weight ratio between the polycarboxylic acid based polymer and the weight of the silicon compound (4) is preferably in a range of 99.5:0.5 to 90:10, and specifically preferably in a range of 99:1 to 95:5. In the case where at least one of γ-aminopropyltrimethoxysilane and γ-aminopropyltriethoxysilane is used for a silane coupling agent expressed by the general formula (1), the weight ratio of the polycarboxylic acid based polymer to the weight of the silicon compound (4) is preferably in a range of 99:1 to 80:20, and specifically preferably in a range of 95:5 to 80:20.

In the above ranges, the second barrier layer according to the present embodiment has improved or even excellent barrier properties, and the expansion of the second barrier layer can be more efficiently prevented in depositing the protective layer formed of a water-based coating liquid on the second barrier layer.

Moreover, since the second barrier layer according to the present embodiment can contain the silicon compound (4) in the above ranges, it can be considered that the second barrier layer can be formed in a uniform layer with no phase separation. Furthermore, since the second barrier layer can contain the silicon compound (4), it can be considered that the second barrier layer according to the present embodiment is resistant to acid.

<Zinc Compound>

In the present embodiment, the second barrier layer can contain a zinc compound.

A part of a carboxyl group contained in a polycarboxylic acid based polymer is neutralized in advance with zinc (a part of a carboxyl group is reacted with a zinc compound (e.g., zinc ion)), so that the water resisting properties of the second barrier layer can be improved. Thus, expansion of the second barrier layer can be prevented in depositing the protective layer formed of a water-based coating liquid, described later, on the second barrier layer. From the viewpoint of the stability of a coating liquid E of the second barrier layer, the degree of neutralization of the carboxyl group caused by zinc is preferably 30 mol % or less, and more preferably 25 mol % or less.

The zinc compound includes, for example, simple substances of zinc, oxides, hydroxides, carbonates, organic acid salts (e.g., acetate), inorganic acid salts, ammonium complexes, or secondary to quaternary amine complexes, or carbonates or organic acid salts of these compounds.

Among these zinc compounds, from the viewpoint of industrial productivity, zinc oxide and zinc acetate are more preferably used, and zinc oxide is specifically preferably used.

<Additive>

The second barrier layer may contain various additives.

Additives include plasticizers, resins, dispersants, surfactants, softening agents, stabilizing agents, antiblocking agents, film forming agents, pressure sensitive adhesives, and oxygen absorbents.

For example, a plasticizer is appropriately selected from publicly known plasticizers for use. Specific examples of the plasticizer can include, for example, ethylene glycol, trimethylene glycol, propylene glycol, tetramethylene glycol, 1,3-butanediol, 2,3-butanediol, pentamethylene glycol, hexamethyleneglycol, diethylene glycol, triethylene glycol, polyethylene glycol, polyvinyl alcohol, an ethylene-vinyl alcohol copolymer, polyethylene oxide, sorbitol, mannitol, dulcitol, erythritol, glycerin, lactic acid, fatty acids, starch, and phthalate ester. These plasticizers may be used singly or as a mixture as necessary.

Among these plasticizers, polyethylene glycol, polyvinyl alcohol, an ethylene-vinyl alcohol copolymer, glycerin, and starch are preferable from the viewpoint of the stretchability and gas-barrier properties of the second barrier layer.

In the case where such a plasticizer is contained, the stretchability of the second barrier layer is improved, so that the abuse-resistant properties (degradation resistance properties) of the second barrier layer can be further improved.

In the case where an additive is contained in the second barrier layer, the weight ratio between the polycarboxylic acid based polymer and the weight of the additive (ratio between the polycarboxylic acid based polymer and the additive) is generally in a range of 70:30 to 99.9:0.1, and preferably 80:20 to 98:2.

<Coating Liquid E of the Second Barrier Layer>

The second barrier layer is formed of the coating liquid E. The coating liquid E is formed of the polycarboxylic acid based polymer and at least one silicon compound (4) selected from a group consisting of a silane coupling agent expressed by the general formula (1), a hydrolysate of the silane coupling agent, and a condensate of the silane coupling agent and the hydrolysate. The coating liquid E may contain the above additives as necessary.

Solvents that can be used for the coating liquid E include, but are not specifically limited, water and a mixed solvent of water and an organic solvent and the like. Water is most preferable from the point of solubility of the polycarboxylic acid based polymer. An organic solvent such as alcohol is preferable from the point of improving the solubility of a silane coupling agent expressed by the general formula (1) and the coating properties of the coating liquid E.

As organic solvents, at least one organic solvent selected from a group consisting of lower alcohols having carbon numbers 1 to 5 and lower ketones having carbon numbers 3 to 5, for example, is preferably used.

More specifically, as organic solvents, mention can be made of methanol, ethanol, propanol, 2-propanol, isopropanol, n-butanol, isobutanol, sec-butanol, tert-butanol, acetone, and methyl ethyl ketone. As water, purified water is preferable, and distilled water and deionized water, for example, can be used.

As a mixed solvent of water and an organic solvent, a mixed solvent using water and an organic solvent described above is preferable, and a mixed solvent of water and lower alcohols having carbon numbers 1 to 5 is more preferable.

It should be noted that in a mixed solvent, water is normally present at a ratio of 20 to 95 wt % and the organic solvent is present at a ratio of 80 to 5 wt % (where the sum of water and the organic solvent is 100 wt %).

[Protective Layer]

The protective layer is formed of a coating liquid that contains a polyvalent metal compound, a polyester based resin, a dispersant, and a hardener. The protective layer is preferably formed by coating and drying the coating liquid. The protective layer contains the polyvalent metal compound by 40 to 90 wt % relative to 100 wt % of the protective layer. The dispersant is a sodium salt of the polycarboxylic acid based resin.

The polyvalent metal compound is a compound of a metal (polyvalent metal) in which the valence of metal ions is two or more.

Specific examples of polyvalent metals include alkali earth metals such as magnesium and calcium, transition metals such as titanium, zirconium, chromium, manganese, iron, nickel, copper and zinc, as well as aluminum.

Specific examples of polyvalent metal compounds include, for example, oxides, hydroxides, and carbonates of the polyvalent metals.

In the present embodiment, the protective layer preferably contains a polyvalent metal compound by 40 to 90 wt %, more preferably 50 to 90 wt %, and specifically preferably 60 to 90 wt %, relative to 100 wt % of the protective layer.

In the above ranges, it is considered that the gas-barrier properties and adhesion of the packaging material can be improved.

In the present embodiment, the polyvalent metal compound is preferably a zinc oxide.

The average particle size of zinc oxide particles is not specifically limited. However, from the viewpoint of the barrier properties and the coating suitability, the average particle size is preferably 5 µm or less, more preferably 1 µm or less, and specifically preferably 0.1 µm or less.

<Polyester Resin>

Polyester resins are not specifically limited. However, from the viewpoint of adhesion, such a resin is preferable which is obtained by reaction of a resin formed of polyester polyol with a hardener formed of diisocyanate.

In the present embodiment, a polyester resin is preferably contained by 5 to 30 wt % in the protective layer relative to 100 wt % of the protective layer.

<Dispersant>

In the present embodiment, a coating liquid used for the protective layer contains sodium of a polycarboxylic acid based resin as a dispersant. The polycarboxylic acid based resin has two or more of carboxyl groups in a molecule.

A sodium salt of a polycarboxylic acid based resin includes, for example, a homopolymer sodium salt of unsaturated carboxylic acid such as acrylic acid, maleic acid, methacrylic acid, itaconic acid, fumaric acid, and crotonic acid, as well as a copolymer sodium salt obtained by copolymerization using at least one of these unsaturated carboxylic acids.

Moreover, a copolymer can also be used which is obtained by copolymerization using at least one of a homopolymer sodium salt of the unsaturated carboxylic acid and a sodium salt of the unsaturated carboxylic acid. In other words, a sodium salt of a polycarboxylic acid based resin used in the present embodiment may be a sodium salt of a polycarboxylic acid based resin obtained by neutralizing, with sodium, a carboxyl group contained in a polycarboxylic acid, which has been obtained by polymerizing (copolymerizing) the unsaturated carboxylic acid. Furthermore, a sodium salt of a polycarboxylic acid based resin used in the present embodiment may be a sodium salt of a polycarboxylic acid based resin obtained by polymerizing (copolymerizing) a sodium salt of the unsaturated carboxylic acid.

A copolymer sodium salt obtained by copolymerization using at least one of the unsaturated carboxylic acids is preferably a copolymer sodium salt obtained by copolymerization using two or more of the unsaturated carboxylic acids. Moreover, a copolymer obtained by copolymerization using at least one of the sodium salts of the unsaturated carboxylic acids is preferably a copolymer obtained by copolymerization using two or more of the sodium salts of the unsaturated carboxylic acids. Furthermore, a monomer other than the unsaturated carboxylic acids and the sodium salts of the unsaturated carboxylic acids may be copolymerized.

The sodium salt of the polycarboxylic acid based resin is preferably at least one polycarboxylic acid sodium salt selected from a group consisting of polyacrylic acid sodium salts, polymaleic acid sodium salts, and acrylic acid-maleic acid copolymer sodium salts, from the viewpoint of the dispersion properties of zinc oxide.

<Coating Liquid F of the Protective Layer>

The protective layer is formed of a coating liquid F, and the coating liquid F is prepared by adding a hardener to a liquid precursor F-B. The liquid precursor F-B contains a polyurethane resin or polyester resin, zinc oxide, and a dispersant.

Solvents used for the liquid precursor F-B can include, for example, but not specifically limited to, water and organic solvents such as methyl alcohol, ethyl alcohol, isopropyl alcohol, n-propyl alcohol, n-butyl alcohol, n-pentyl alcohol, dimethyl sulphoxide, dimethyl formamide, dimethyl acetamide, toluene, hexane, heptane, cyclohexane, acetone, methyl ethyl ketone, diethyl ether, dioxane, tetrahydrofuran, ethyl acetate, and butyl acetate.

From the viewpoint of coating suitability, the solid content concentration of these coating liquids is preferably in a range of 1 to 50 mass %, and more preferably in a range of 2 to 30 mass %.

In the gas-barrier packaging material according to the present embodiment, the second barrier layer is separated from the packaging material (protective layer of the packaging material) and then the infrared absorption spectrum of the second barrier layer after separation is measured by a transmission method. In this case, when the maximum peak height in a range of 1,490 to 1,659 cm-1 is taken as $\alpha$, and the maximum peak height in a range of 1,660 to 1,750 cm-1 is taken as $\beta$, a ratio between $\alpha$ and $\beta$ as expressed by $\alpha/\beta$ is less than one.

For example, the infrared absorption spectrum can be measured by the following method.

First, the second barrier layer is separated from the packaging material. The separation method includes, for example, a method of directly peeling off the second barrier layer from the protective layer of the packaging material.

Subsequently, the infrared absorption spectrum of the second barrier layer after separation is measured by a transmission method using FT-JR1710 manufactured by Perkin-Elmer Co., Ltd. In the infrared absorption spectrum obtained in this way, the ratio between the maximum peak height $\alpha$ of a peak appearing in a range of 1,490 to 1,659 cm-1 and the maximum peak height $\beta$ of a peak appearing in a range of 1,660 to 1,750 cm-1 as expressed by $\alpha/\beta$ is calculated.

When a polycarboxylic acid based polymer used in the present embodiment forms an ionic crosslink to a polyvalent metal ion, an absorption maximum derived from the C=O stretching vibration of the salt (—COO—) of a carboxyl group is shown near 1,560 cm-1. In this case, the maximum peak height $\alpha$ in a range of 1,490 to 1,659 cm-1 is a measure of the extent of the ionic crosslink formation between the carboxyl group and the polyvalent metal ion.

On the other hand, the carboxyl group before forming the ionic crosslink to the polyvalent metal ion shows an absorption maximum derived from the C=O stretching vibration of the carboxyl group (—COOH) near 1,720 cm-1. In this case, the maximum peak height $\beta$ in a range of 1,660 to 1,750 cm-1 is a measure of the abundance of the carboxyl group that does not form an ionic crosslink to the polyvalent metal ion.

In the second barrier layer according to the present embodiment, the ratio of $\alpha/\beta$ between the peaks of the infrared absorption spectrum (IR) is less than one. When the ratio of $\alpha/\beta$ between the peaks of the infrared absorption spectrum is less than one, most of the carboxyl groups in the polycarboxylic acid based polymers in the second barrier layer do not form ionic crosslinks to the polyvalent metal ions and thus the second barrier layer is flexible. In this state, if the packaging material is subjected to abuse such as extension (if a load is applied to the packaging material), no defect is caused in the second barrier layer.

It is considered that the sodium salt of the polycarboxylic acid based resin has a higher adsorptive capacity to polyvalent metal compounds, more specifically zinc oxide, due to the alkyl group of the polycarboxylic acid based resin. Further, it is considered that the sodium salt of the polycarboxylic acid based resin more easily generates electrical repulsion caused by ionization after adsorption to a polyvalent metal compound, more specifically to the surface of zinc oxide, due to the carboxyl group of the polycarboxylic acid based resin. Therefore, it is considered that the sodium salt of the polycarboxylic acid based resin can contribute to favorable dispersion of zinc oxide.

According to the present embodiment, the sodium salt of the polycarboxylic acid based resin having the above-mentioned properties is used for the dispersant. Therefore, it is considered that the a polyvalent metal compound such as zinc oxide is prevented from being aggregated and precipitates are prevented from being formed in a liquid precursor of the coating liquid of the protective layer before addition of a hardener, and thus a sufficiently stable coating liquid is obtained.

It is considered that provision of sufficient stability to the liquid precursor enables coating by maintaining a favorable dispersion of components in the liquid precursor. Thus, there is no need of low temperature storage facility such as a refrigerator, and a facility promptly used after preparation of the coating liquid.

Moreover, the liquid precursor F-B forms small aggregates, and the protective layer formed of the coating liquid F using the liquid precursor F-B is uniformly formed, which contributes to preventing an increase in the haze of the gas-barrier packaging material. Furthermore, it is considered that a uniform protective layer provides a uniform ionic crosslink between polyacrylic acid and the polyvalent metal ion as well and sufficient barrier properties can be obtained.

In the present embodiment, the dispersant is preferably contained by 2 to 20 wt % relative to 100 wt % of the polyvalent metal compound.

It is considered that the formulation ratio of the dispersant set in the above range can contribute to obtaining a coating liquid that does not easily form agglomerates and precipitates.

The liquid precursor F-B according to the present embodiment is prepared as the coating liquid F by adding a hardener immediately before use, and the protective layer can be formed by coating and drying the coating liquid.

Although the hardener is not specifically limited, an isocyanate compound is suited.

Second Embodiment

A gas-barrier packaging material according to a second embodiment of the present invention is obtained by applying at least one processing step selected from a group consisting of retort processing, boiling, and humidification, to the gas-barrier packaging material according to the first embodiment. When the second barrier layer is separated and an infrared absorption spectrum of the second barrier layer after separation is measured by a transmission method, a ratio of α/β not less than one is established, where a is a maximum peak height in a range of 1,490 to 1,659 cm-1 and β is a maximum peak height in a range of 1,660 to 1,750 cm-1.

[Retort Processing, Boiling, and Humidification]

In the gas-barrier packaging material according to the present embodiment, the gas-barrier packaging material is subjected to at least one processing step selected from a group consisting of retort processing, boiling, and humidification.

The retort processing is generally a method of pressurizing and sterilizing microorganisms such as mold, yeasts, and bacteria in order to preserve foods and the like. The retort processing includes a method of pressurizing and sterilizing a gas-barrier packaging material that contains foods therein, under the conditions of 105 to 140° C. and 0.15 to 0.3 MPa for 10 to 120 minutes.

Retort devices include a steam system using heating steam and a hot water system using pressurized superheated steam. Retort devices are appropriately used depending on the sterilizing conditions for foods and the like to be contents.

Boiling is a method of sterilization using moist heat to preserve foods and the like. Although it depends on contents, boiling includes a method of sterilizing a gas-barrier packaging material that contains foods therein and the like under the conditions of an atmospheric pressure at 60 to 100° C. for 10 to 120 minutes.

Boiling includes batch processing using a hot water bath in which a gas-barrier packaging material is immersed in a hot water bath at a constant temperature and taken out after a given time period, and a continuous method in which a gas-barrier packaging material is passed through a hot water bath tunnel for sterilization.

In the humidification process, a gas-barrier packaging material is usually placed under the conditions of an atmospheric pressure at 10 to 99° C. with a relative humidity of 20 to 99%. The optimum range of humidification time depends on temperature and humidity. Humidification of longer time is necessary at lower temperature and lower humidity, whereas a process can be finished in a shorter time at higher temperature and higher humidity. A laminate having sufficient gas-barrier properties can be obtained when the humidification process is performed, for example, for ten hours or longer under the conditions of 20° C. and a relative humidity of 80%, for three hours or longer under the conditions of 40° C. and a relative humidity of 90%, and for 30 minutes or longer under the conditions of 60° C. and a relative humidity of 90%. In the case where another substrate is laminated on the gas-barrier packaging material through an adhesive agent, the humidification time necessary to provide sufficient gas-barrier properties is longer than that in the case where another substrate is not laminated.

In the gas-barrier packaging material according to the present embodiment, the ratio between the maximum peak height α in a range of about 1,490 to 1,659 cm-1 and the maximum peak height β in a range of about 1,660 to 1,750 cm-1 as expressed by α/β is not less than about one in the infrared absorption spectrum of the second barrier layer measured by a transmission method after separating the second barrier layer from the packaging material (protective layer of the packaging material).

For example, the infrared absorption spectrum can be measured by the following method.

First, the second barrier layer is separated from the packaging material (protective layer of the packaging material). The separation method includes, for example, a method of directly peeling off the second barrier layer from the protective layer.

Subsequently, the infrared absorption spectrum of the second barrier layer after separation is measured by a transmission method using FT-JR1710 manufactured by Perkin-Elmer Co., Ltd. In the infrared absorption spectrum obtained in this way, the ratio between the maximum peak height α of a peak appearing in a range of about 1,490 to 1,659 cm-1 and the maximum peak height β of a peak appearing in a range of about 1,660 to 1,750 cm-1 as expressed by α/β is calculated.

When the polycarboxylic acid based polymer used in the present embodiment forms an ionic crosslink to a polyvalent metal ion, an absorption maximum derived from the C=O stretching vibration of the salt (—COO—) of a carboxyl group is shown near 1,560 cm-1. In this case, the maximum peak height α in a range of about 1,490 to 1,659 cm-1 is a measure of the extent of the ionic crosslink formation between the carboxyl group and the polyvalent metal ion.

On the other hand, the carboxyl group before forming the ionic crosslink to the polyvalent metal ion shows an absorption maximum derived from the C=O stretching vibration of the carboxyl group (—COOH) near 1,720 cm-1. In this case, the maximum peak height β in a range of about 1,660 to 1,750 cm-1 is a measure of the abundance of the carboxyl group that does not form an ionic crosslink to the polyvalent metal ion.

In the second barrier layer according to the present embodiment, the ratio of α/β between the peaks of the infrared absorption spectrum (IR) is not less than about one. When the ratio of α/β between the peaks of the infrared absorption spectrum is not less than about one, this means that most of the carboxyl groups in the polycarboxylic acid based polymers in the second barrier layer form ionic crosslinks to polyvalent metal ions. A packaging material having sufficient gas-barrier properties against oxygen can be obtained when ionic crosslinks are formed between the carboxyl groups and the polyvalent metal ions.

The gas-barrier packaging material according to the first embodiment has flexibility because the packaging material is not subjected to retort processing and the like, and the ratio of α/β is less than about one. The gas-barrier packaging material according to the second embodiment can provide sufficient oxygen barrier properties because the packaging material is subjected to retort processing and the like and the ratio of α/β is not less than about one, most of the carboxyl groups in the polycarboxylic acid based polymer form ionic crosslinks to polyvalent metal ions.

According to the first embodiment, a gas-barrier packaging material having improved or even excellent oxygen barrier properties and water vapor barrier properties can be provided without performing retort processing or the like. The gas-barrier packaging material according to the second embodiment has improved or even excellent abuse-resistant properties (degradation resistance properties) and resistant to high temperature and high pressure processing such as retort processing, and exhibits remarkably improved or even excellent gas-barrier properties against oxygen after high temperature and high pressure processing such as retort processing.

It is considered that this is because the first adhesive layer and the first barrier layer are laminated on the support, and improved or even excellent oxygen barrier properties and improved or even excellent water vapor barrier properties are provided owing to the first barrier layer if the material is not subjected to retort processing or the like.

Furthermore, the first barrier layer is more easily cracked than an organic substance is, and thus is cracked by a physical load, sometimes leading to the degradation of the oxygen barrier properties and the water vapor barrier properties.

In this regard, in the first embodiment, the second barrier layer and the protective layer are laminated. It is considered that, owing to this laminate, a highly flexible gas-barrier packaging material is provided before retort processing, the second barrier layer and the protective layer can maintain the physical properties if physical loads such as bending and tension are applied, and the material has improved or even excellent abuse-resistant properties (degradation resistance properties).

Moreover, as in the second embodiment, since the oxygen barrier properties due to the second barrier layer and the protective layer appear after high temperature and high pressure processing such as retort processing, it is considered that a packaging material with improved or even remarkably excellent in gas-barrier properties against oxygen can be obtained.

<Coating>

There is no particular limitation in the coating methods of coating the coating liquid A, the coating liquid E, and the coating liquid F in the processes of forming the adhesive layer, the first barrier layer, the second barrier layer, and the protective layer. For example, the coating methods include casting, dipping, roll coating, gravure coating, screen printing, reverse coating, spray coating, kit coating, die coating, metaling bar coating, chamber-doctor combined coating, and curtain coating. Moreover, coating and drying are continuously performed. For example, drying the coating liquid E and coating the coating liquid F may be continuously performed, or may be performed by way of a rolling process and a curing (aging) process.

<Drying>

The coating liquid A, the coating liquid E, and the coating liquid F form the adhesive layer, the second barrier layer, and the protective layer, respectively, with the removal of solvents by drying after coating.

Drying methods include, for example, but are not specifically limited to, hot air drying, a hot roll contact, infrared heating, and microwave heating. These drying methods may be used singly or in combination. Drying temperatures are not specifically limited but usually 50 to 160° C. is preferable if water and a mixed solvent of water and an organic solvent described above are used as solvents. Drying is usually preferably performed at a normal pressure or reduced pressure. From the viewpoint of the simplifying facility, a normal pressure is preferable.

<Range of the Oxygen Permeability>

It is preferable that the gas-barrier packaging material according to the present embodiment usually has an oxygen permeability of 300 cm$^3$ (STP)/m$^2$·day·MPa or less, more preferably 200 cm$^3$ (STP)/m$^2$·day·MPa or less, specifically preferably 100 cm$^3$ (STP)/m$^2$·day·MPa or less, and most preferably 10 cm$^3$ (STP)/m$^2$·day·MPa or less, at a temperature of 30° C. and a relative humidity of 70%. The gas-barrier packaging material according to the present embodiment is applied with a stress such as extension and bending before being subjected to at least one processing step selected from a group consisting of retort processing, boiling, and humidification. Thus, when the packaging material is subjected to abuse as well by (when a load is applied to the packaging material), the packaging material is subjected to at least one processing step selected from a group consisting of retort processing, boiling, and humidification to impart the packaging material with sufficient gas-barrier properties. When the packaging material is subjected to at least one processing step selected from a group consisting of retort processing, boiling, and humidification after being subjected to abuse (after a load is applied to the packaging material), it is preferable that the oxygen permeability of the packaging material is usually 300 cm$^3$ (STP)/m$^2$·day·MPa or less, more preferably 200 cm³ (STP)/m²·day·MPa or less, specifically preferably 100 cm³ (STP)/m²·day·MPa or less, and most preferably 30 cm³ (STP)/m²·day·MPa or less, at a temperature of 30° C. and a relative humidity of 70%.

<Range of the Water Vapor Permeability>

It is preferable that, in the gas-barrier packaging material according to the present embodiment, the water vapor permeability at a temperature of 40° C. and a relative humidity of 90% is usually 50 g/m2-day or less, more preferably 20 g/m2-day or less, specifically preferably 10 g/m2-day or less, and most preferably 5 g/m2-day or less.

<Application (Lamination)>

In the gas-barrier packaging material according to the present embodiment, another substrate may be further laminated on the gas-barrier packaging material to provide strength, sealing properties, easy opening in a sealed state, aesthetic quality, light blocking properties, and the like. After depositing another substrate on the gas-barrier packaging material, and at least one processing step selected from a group consisting of retort processing, boiling, and humidification may be performed. The other substrate is appropriately selected according to purposes. However, usually, plastic films and paper sheets are preferable. As these plastic films and paper sheets, a single material may be used, or two or more materials may be laminated, or a plastic film and a paper sheet may be laminated with each other. The shape of the substrate includes, for example, but is not specifically limited to, shapes of film, sheet, bottle, cup, tray, tank, and tube. From the viewpoint of depositing the gas-barrier packaging material, a shape of film or sheet is preferable, or a sheet before cup molding or a flat tube is also preferable. In a lamination method that can be used, a laminate is formed using an adhesive agent. Specific lamination methods include dry lamination, wet lamination, and extrusion lamination. Modes of lamination for a substrate using these other methods are not specifically limited but, from the viewpoint of the handleability of products, include, for example, [gas-barrier packaging material/polyolefin], [gas-barrier packaging material/polyolefin (tubular)/the gas-barrier packaging material], [gas-barrier packaging material/nylon/polyolefin], [gas-barrier packaging material/polyolefin/paper sheet/polyolefin], [polyolefin/gas-barrier packaging material/polyolefin], [polyolefin/gas-barrier packaging material/nylon/polyolefin], and [polyethylene terephthalate/gas-barrier packaging material/nylon/polyolefin]. These modes of lamination may be repeatedly laminated.

It is noted that the expression [gas-barrier packaging material/polyolefin] means a laminate in which polyolefin is laminated on the gas-barrier packaging material. Furthermore, the expression [gas-barrier packaging material/nylon/polyolefin] means a laminate that the gas-barrier packaging material, nylon, and polyolefin are sequentially laminated. In the following, the order of lamination in a laminated structure is written in a manner similar to the above laminate examples.

From the viewpoint of providing aesthetic quality, light blocking properties, moisture barrier properties, and the like, a printing layer and a deposited layer of a metal and a silicon compound may be laminated on the laminates. It is preferable that the lamination surface of the barrier layer and the like of the gas-barrier packaging material are not disposed on the outermost layer from the viewpoint of the barrier properties. When the barrier layer and the like are disposed on the outermost layer, there is a risk that the barrier layer and the like may be cut and the barrier properties decreased.

EXAMPLES

In the following, the present invention will be described more in detail according to examples. However, the present invention is not limited to examples below.

<Description of Evaluation Methods>
<Lamination>

For each obtained barrier packaging material, Ny (oriented nylon film) and CPP (polypropylene film) were sequentially stuck to each other using a multi-coater TM-MC manufactured by HIRANO TECSEED with an adhesive agent, and a laminate film of [barrier packaging material/adhesive agent/Ny/adhesive agent/CPP] was prepared. The lamination surfaces of the barrier layer and the like of the barrier packaging material were disposed so as to contact the adhesive agent. As the adhesive agent, a two-part curing polyurethane adhesive agent [Takelac A620 (base resin)/Takenate A65 (hardener)] manufactured by Mitsui Chemicals, Inc., was used. As Ny, an oriented nylon film, Emblem ONMB (15 μm) manufactured by Unitika Ltd, was used. As CPP, a polypropylene film, Trefan ZK93KM (60 μm) manufactured by Toray Advanced Film Co., Ltd., was used. The obtained laminate films were stuck to each other, followed by curing (aging) at a temperature of 40° C. for three days.

<Abuse Test by Bending (Accelerated Aging Test)>

Each obtained laminate film was bent 50 times using a Gelbo flex tester manufactured by Tester Sangyo Co., Ltd.

<Forming a Pouch and Filling Water>

The CPP layers of the obtained laminate films or the CPP layers of the laminate films bent 50 times were stuck to each other using an impulse sealer to prepare a three-sided pouch in the size of 100 mm×140 mm was prepared, and then 100 g of water was filled in the pouch.

<Retort Processing>

The obtained pouch was subjected to retort processing (at a temperature of 120° C. for 30 minutes with a processing bath pressure of 2 Kg, using a hot water immersion retort system (RCS-60/10TG manufactured by Hisaka Works, Ltd.), and then the water vapor permeability and the oxygen permeability were measured.

<Measurement of the Oxygen Gas Permeability>

The oxygen permeability of the packaging material was measured under the conditions at a temperature of 30° C. and a relative humidity of 70% using an oxygen permeability tester, OXTRAN™ 2/20 manufactured by Modern Control Co. The measurement method was conformed to ASTMF 1927-98 (2004), and the measured values were written in units of cm3 (STP)/(m2-day-MPa). Herein, (STP) means standard conditions (0° C., 1 atm.) for defining the volume of oxygen.

<Measurement of the Water Vapor Permeability>

For the water vapor permeability of the packaging material, the moisture permeability was measured under the conditions at a temperature of 40° C. and a relative humidity of 90% (ASTMF 1249-01) using a PERMATRAN-W3/31 manufactured by Modern Control Co. The measured values were written in units of g/(m2-day).

<Dispersion Properties of the Liquid Precursor F-B of the Coating Liquid F>

The liquid precursor F-B of the coating liquid F for the protective layer was sealed in a metal eighteen-liter can and stored in an environment of 30° C. for one month. Then, the dispersion properties of the liquid precursor F-B were visually observed as to the presence or absence of agglomerates and precipitates in the liquid precursor F-B.

Evaluation was made in three stages, which are, A: agglomerate and precipitates are not formed; B: agglomerates are observed in the coating liquid; C: agglomerates are observed and precipitates are formed on the bottom of the can.

<Measurement of Haze>

The haze of the packaging material was measured using a haze meter, HazeMeter NDH2000 manufactured by Nippon Denshoku Industries Co., Ltd.

Coating liquid A: The coating liquid A was prepared by the following procedure.

Polyol, an Si agent, a hardener, and ethyl acetate were mixed with the formulation shown in Table 1 to prepare the coating liquid A.

As polyol, Dianal LR209 (acrylic polyol) manufactured by Mitsubishi Rayon Co., Ltd. was used. As the Si agent, KBE9007 (3-isocyanatepropyltriethoxysilane) manufactured by Shin-Etsu Silicones was used. As the hardener, polyurethane, Takenate A56 (IPDI, XDI) manufactured by Mitsui Chemicals, Inc. was used. As ethyl acetate, ethyl acetate manufactured by Tokyo Chemical Industry Co., Ltd. was used.

TABLE 1

|  | Weight (Solid Content Concentration) |
|---|---|
| Polyol | 10 (50%) |
| Si Agent | 1 (100%) |
| Hardener | 6.25 (56.25%) |
| Ethyl Acetate | 300 (—) |
| Total | 317.25 (3%) |

Coating liquid E: The coating liquid E was prepared by the following procedure.

Polycarboxylic acid, zinc oxide, the Si agent, distilled water, and 2-propanol were mixed with the formulation shown in Table 2 to prepare the coating liquid E.

As polycarboxylic acid, Aron A10-H (polyacrylic acid) manufactured by Toagosei Co., Ltd. was used. As zinc oxide, zinc oxide manufactured by Tokyo Chemical Industry Co., Ltd. was used.

As the Si agent, KBM403 (3-glycidoxypropyltrimethoxysilane) manufactured by Shin-Etsu Silicones was used. As 2-propanol, 2-propanol manufactured by Tokyo Chemical Industry Co., Ltd. was used.

TABLE 2

|  | Weight (Solid Content Concentration) |
|---|---|
| Polycarboxylic Acid | 20 (25%) |
| Zinc Oxide | 0.6 |
| Si Agent | 0.1 (100%) |
| Distilled Water | 56.0 (—) |
| 2-Propanol | 37.3 (—) |
| Total | 114 (5%) |

Coating liquid F-A: The coating liquid F-A was prepared by the following procedure.

Zinc oxide, a sodium salt of a polycarboxylic acid based resin, and water were mixed with the formulation shown in Table 3 to prepare the coating liquid F-A.

As zinc oxide, FINEX50 (zinc oxide ultrafine particles) manufactured by Sakai Chemical Industry Co., Ltd. was used. As the sodium salt of the polycarboxylic acid based resin, Aron T-50 (sodium polyacrylate) manufactured by Toagosei Co., Ltd. was used. As stirring the coating liquid F-A, a T.K Filmix (high-speed mixer) manufactured by PRIMIX Corporation was used.

TABLE 3

|  | Weight (Solid Content Concentration) |
|---|---|
| Zinc Oxide | 30.0 (100%) |
| Sodium Salt of Polycarboxylic Acid Based Resin | 3.0 (40%) |
| Water | 67.0 (—) |
| Total | 100.0 (31.2%) |

The obtained F-A, polyester resin, 2-propanol, and water were mixed with the formulation shown in Table 4 to prepare the coating liquid F-B.

As polyester resin, Elitel KT-8803 manufactured by Unitika Ltd. was used.

As 2-propanol, 2-propanol manufactured by Tokyo Chemical Industry Co., Ltd. was used.

TABLE 4

|  | Weight (Solid Content Concentration) |
|---|---|
| F-A | 25.0 (31.2%) |
| Polyester Resin | 4.1 (30%) |
| 2-Propanol | 10.3 (—) |
| Water | 55.1 (—) |
| Total | 94.5 (9.6%) |

Coating liquid F: The coating liquid F was prepared by the following procedure.

The obtained F-B and isocyanate compound were mixed with the formulation ratio in table 5 to prepare the coating liquid F.

As isocyanate compound, Liofol Hardener UR5889-21 manufactured by Henkel AG was used.

TABLE 5

|  | Weight (Solid Content Concentration) |
|---|---|
| F-B | 94.5 (9.6%) |
| Isocyananate Compound | 0.5 (100%) |
| Total | 95.0 (10.0%) |

In the following, examples and comparative examples are shown. It should be noted that obtained gas-barrier packaging materials were processed and evaluated according to <Description of Evaluation Methods>(<Lamination> to <Measurement of Haze>) described above, unless otherwise specified.

Example 1

Using an oriented PET film as a substrate, the coating liquid A was applied onto the substrate using a bar coater so as to have a dry thickness of 0.2 μm, thereby obtaining [substrate/adhesive layer]. As the oriented PET film, a polyethylene terephthalate film, Lumilar P60 (12 µm) manufactured by Toray Industries Inc., was used.

Metal aluminum was evaporated using a vacuum deposition apparatus based on electron beam heating, an oxygen gas was introduced into the evaporated aluminum, the aluminum oxide was deposited onto the adhesive layer to form an inorganic deposited layer with a thickness of 20 nm on the adhesive layer of the [substrate/adhesive layer], thereby obtaining [substrate/adhesive layer/first barrier layer].

On the first barrier layer of the [substrate/adhesive layer/first barrier layer] thus obtained, the coating liquid E and the coating liquid F were sequentially applied using a bar coater and dried so that the coating liquid E had a dry thickness of 0.3 µm and the coating liquid F had a dry thickness of 0.3 µm, thereby obtaining a laminate of [substrate/adhesive layer/first barrier layer/second barrier layer/protective layer].

The dispersion properties of the liquid precursor F-B of the coating liquid F were evaluated.

Example 2

The coating liquid E and the coating liquid F described in Example 1 were applied and dried using a gravure 10-color tester (manufactured by Fuji Kikai Kogyo Co., Ltd).

Example 3

The laminate configuration was changed to Ny and CPP described in <Lamination> and a flat tube was used, thereby obtaining [gas-barrier packaging material/polyolefin (tubular)/gas-barrier packaging material]. Processes were performed similar to the processes described in Example 1 except that the retort processing was changed to the retort processing described in <Retort Processing> above, and the humidification process was performed under the conditions of 40° C. and a relative humidity of 90% for one day. The oxygen permeability measurement and the water vapor permeability measurement were performed to [gas-barrier packaging material/polyolefin] obtained by cutting and opening the tube of the obtained [gas-barrier packaging material/polyolefin (tubular)/gas-barrier packaging material].

The flat tube was shaped as bellow. An LDPE resin was discharged using a biaxial extruder, and shaped in a tubular shape. The obtained tube was cooled and solidified by water bathing and then taken up to obtain a flat tube. As LDPE, NOVATEC LDLF420M manufactured by Japan Polychem Corporation was used, and as the biaxial extruder, a TEM-26SS (screw diameter of 26 mm, L/D=60) manufactured by Toshiba Machine Co., Ltd was used.

Example 4

Processes and were performed similar to Example 1 except that as the sodium salt of the polycarboxylic acid based resin of the coating liquid F-A described in Example 1, Aquarick DL40S (containing sodium polyacrylate at a solid content of 40%) manufactured by Nippon Shokubai Co., Ltd. was used.

Example 5

Processes were performed similar to Example 1 except that as the sodium salt of the polycarboxylic acid based resin of the coating liquid F-A described in Example 1, Aron A-6330 (containing sodium acrylate-maleate copolymer at a solid content of 40%) manufactured by Toagosei Co., Ltd. was used.

Example 6

Processes were performed similar to Example 1 except that as the sodium salt of the polycarboxylic acid based resin of the coating liquid F-A described in Example 1, Poise 520 (containing sodium acrylate-maleate copolymer at a solid content of 40%) manufactured by Kao Corporation was used.

Example 7

Processes were performed similar to Example 1 except that 3 g of sodium salt of the polycarboxylic acid based resin of the coating liquid F-A described in Example 1 were changed to 1.5 g of sodium salt of the polycarboxylic acid based resin and 1.5 g of water.

Example 8

Processes were performed similar to Example 1 except that 3 g of sodium salt of the polycarboxylic acid based resin of the coating liquid F-A described in Example 1 were changed to 15 g of sodium salt of the polycarboxylic acid based resin and water of the coating liquid F-A was changed to 55 g.

Comparative Example 1

Using an oriented PET film as a substrate, the coating liquid E and the coating liquid F were sequentially applied to the substrate using a bar coater and dried so that the coating liquid E had a dry thickness of 0.3 µm and the coating liquid F had a dry thickness of 0.3 µm, thereby obtaining [substrate/barrier layer/protective layer]. As the oriented PET film, a polyethylene terephthalate film, Lumilar P60 (12 µm) manufactured by Toray Industries, Inc., was used.

Comparative Example 2

Using an oriented PET film was as a substrate, the coating liquid A was applied to the substrate using a bar coater and dried so that the coating liquid A had a dry thickness of 0.2 µm, thereby obtaining [substrate/adhesive layer]. As the oriented PET film, a polyethylene terephthalate film, Lumilar P60 (12 µm) manufactured by Toray Industries, Inc., was used.

Metal aluminum was evaporated using a vacuum deposition apparatus based on electron beam heating, an oxygen gas was introduced into the evaporated aluminum, and the aluminum oxide was deposited onto the adhesive layer of the [substrate/adhesive layer] to form an inorganic deposited layer with a thickness of 20 nm on the adhesive layer, thereby obtaining [substrate/adhesive layer/first barrier layer].

On the first barrier layer of thus obtained [substrate/adhesive layer/first barrier layer], the coating liquid F was applied using a bar coater and dried so as to have a dry thickness of 0.2 µm, thereby obtaining [substrate/adhesive layer/first barrier layer/protective layer].

Comparative Example 3

Processes were performed similar to Example 1 except that Aron A-6012 (containing sodium sulfonate copolymer at a solid content of 40%) manufactured by Toagosei Co., Ltd. was used instead of the sodium salt of the polycarboxylic acid based resin of the coating liquid F-A described in Example 1.

Comparative Example 4

Processes were performed similar to Example 1 except that 1.2 g of Emal O (having solid content concentration of sodium laurate by 100%) manufactured by Kao Corporation and 1.8 g of water were used instead of the sodium salt of the polycarboxylic acid based resin of the coating liquid F-A described in Example 1.

Comparative Example 5

Processes were performed similar to Example 1 except that Kohtamin 24P (having solid content concentration of quaternary ammonium salt by 20%) manufactured by Kao Corporation was used instead of the sodium salt of the polycarboxylic acid based resin of the coating liquid F-A described in Example 1.

Comparative Example 6

Processes were performed similar to Example 1 except that in the coating liquid F-A described in Example 1, the sodium salt of the polycarboxylic acid based resin was not used and the coating liquid F-A was obtained using 30 g of zinc oxide and 70 g of water.

Table 6 shows the oxygen permeability and water vapor permeability of the obtained laminate films of the packaging materials before and after the retort processing, the haze of the packaging materials, and the dispersion properties of the liquid precursors F-B of the coating liquids F.

In Tables, A, B and C are defined as follows:

A: Agglomerates and precipitates not observe

B: Agglomerates observed

C: Agglomerates and precipitates observed.

TABLE 6

| | Oxygen Permeability 30° C. 70% RH ($cm^3$(STP)/ ($m^2$-day-MPa)) | | | Water Vapor Permeability 40° C. 90% RH ($g/m^2$-day) | | Haze (%) | Dispersion Properties of Liquid Precursor F-B |
|---|---|---|---|---|---|---|---|
| | Before retort | After retort | Bending and then retort | Before retort | After retort | | |
| Example 1 | 5 | 1 | 7 | 1 | 1.5 | 3 | A |
| Example 2 | 5 | 1 | 7 | 1 | 1.5 | 3 | A |
| Example 3 | 5 | 1 | 7 | 1 | 1.5 | 3 | A |
| Example 4 | 5 | 1 | 7 | 1 | 1.5 | 3 | A |
| Example 5 | 5 | 1 | 7 | 1 | 1.5 | 3 | A |
| Example 6 | 5 | 1 | 7 | 1 | 1.5 | 3 | A |
| Example 7 | 5 | 1 | 7 | 1 | 1.5 | 3 | A |
| Example 8 | 5 | 1 | 7 | 1 | 1.5 | 4 | A |
| Comparative Example 1 | 1000 | 5 | 5 | 50 | 50 | 3 | A |
| Comparative Example 2 | 10 | 100 | 200 | 1 | 10 | 3 | A |
| Comparative Example 3 | 5 | 1 | 7 | 1 | 1.5 | 6 | B |
| Comparative Example 4 | 5 | 3 | 15 | 1 | 5.0 | 9 | C |
| Comparative Example 5 | 5 | 3 | 15 | 1 | 5.0 | 9 | C |
| Comparative Example 6 | 5 | 5 | 20 | 1 | 6.0 | 15 | C |

Examples 1 to 8 had remarkably low oxygen permeabilities and were excellent in barrier properties before and after the retort processing of the packaging materials, and in the case of applying retort processing to the packaging materials after abuse tests of bending (accelerated aging tests). Moreover, Examples 1 to 8 also had remarkably low water vapor permeabilities and were excellent in barrier properties before and after the retort processing of the packaging materials.

Furthermore, the liquid precursors F-B of the coating liquids F of Examples 1 to 8 did not form agglomerates and precipitates after storage in an environment of 30° C. for one month, and were excellent in storage stability.

What is claimed is:

1. A gas-barrier packaging material comprising:
   a support;
   an adhesive layer laminated on the support, wherein the adhesion layer comprises a silicon compound having any one of an isocyanate group, an amino group, and a mercapto group or a hydrolysate of the silicon compound, an acrylic polyol having a hydroxyl number of 5 to 200 KOH mg/g, and an isocyanate compound;
   a first barrier layer laminated on the adhesive layer;
   a second barrier layer laminated on the first barrier layer; and
   a protective layer laminated on the second barrier layer, wherein:
      the protective layer is formed of a coating liquid comprising a polyvalent metal compound by 40 to 90 wt % relative to 100 wt % of the protective layer, a polyester based resin, and a dispersant that is a sodium salt of a polycarboxylic acid based resin selected from the group consisting of acrylic acid, maleic acid, methacrylic acid, itaconic acid, fumaric acid, crotonic acid, or combinations of two or more thereof; and
      the second barrier layer exhibits an infrared absorption spectrum having a ratio as expressed by α/β of less than about one, wherein α is a maximum peak height in a range of about 1,490 to about 1,659 cm−1 and β is a maximum peak height in a range of about 1,660 to about 1,750 cm−1, wherein the dispersant is present in the amount of 2 to 20 wt % relative to 100 wt % of the polyvalent metal compound, wherein the polyester based resin is obtained by a reaction of a resin formed of polyester polyol with a hardener which is an isocyanate compound, wherein the polyester based resin constitutes 5 to 30 wt % of the protective layer and wherein the hardener constitutes about 0.5 wt % of the coating liquid.

2. A gas-barrier packaging material obtained by applying at least one processing step selected from a group consisting of retort processing, boiling, and humidification to the gas-barrier packaging material according to claim 1,
wherein:
when the second barrier layer exhibits an infrared absorption spectrum having a ratio as expressed by α/β of less than about one, wherein α is a maximum peak height in a range of about 1,490 to about 1,659 cm−1 and β is a maximum peak height in a range of about 1,660 to about 1,750 cm−1.

\* \* \* \* \*